United States Patent
Lee et al.

(10) Patent No.: US 12,154,349 B2
(45) Date of Patent: Nov. 26, 2024

(54) METHOD FOR DETECTING THREE-DIMENSIONAL OBJECTS IN ROADWAY AND ELECTRONIC DEVICE

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 341 days.

(21) Appl. No.: 17/895,517

(22) Filed: Aug. 25, 2022

(65) Prior Publication Data

US 2023/0386222 A1   Nov. 30, 2023

(30) Foreign Application Priority Data

May 31, 2022   (CN) .......................... 202210613588.2

(51) Int. Cl.
  *G06V 20/58*   (2022.01)
  *G06V 10/764*   (2022.01)
  (Continued)

(52) U.S. Cl.
  CPC ............ *G06V 20/58* (2022.01); *G06V 10/764* (2022.01); *G06V 10/7715* (2022.01);
  (Continued)

(58) Field of Classification Search
  CPC .. G06V 20/58; G06V 10/764; G06V 10/7715; G06V 10/7747; G06V 10/82;
  (Continued)

(56) References Cited

U.S. PATENT DOCUMENTS

2018/0089533 A1*   3/2018   Zagaynov ........... G06V 30/1607
2020/0160532 A1*   5/2020   Urtasun ................ G01S 17/931
(Continued)

FOREIGN PATENT DOCUMENTS

CN   110062871 A *   7/2019   ............. G01C 21/32
CN   114078246     2/2022
(Continued)

OTHER PUBLICATIONS

Chen, L. C. (2017). Rethinking atrous convolution for semantic image segmentation. arXiv preprint arXiv:1706.05587. (Year: 2017).*

(Continued)

*Primary Examiner* — Charles T Shedrick
(74) *Attorney, Agent, or Firm* — ScienBiziP, P.C.

(57) ABSTRACT

A method for detecting three-dimensional (3D) objects in roadway is applied in an electronic device. The device inputs training images into a semantic segmentation model, and performs convolution operations and pooling operations on the training images and obtains feature maps. The electronic device performs up-sampling operations on the feature maps to obtain first images, classifies pixels on the first images, calculates and optimizes a classification loss and obtains a trained semantic segmentation model. The device inputs the detection images into the trained semantic segmentation model, determines object models of the objects, point cloud data and distances from the depth camera to the object models, determines rotation angles of the object models according to the point cloud data and the object models, and determines positions of the object models in 3D space according to the distances, the rotation angles, and positions of the objects.

20 Claims, 4 Drawing Sheets

(51) Int. Cl.
*G06V 10/77* (2022.01)
*G06V 10/774* (2022.01)
*G06V 10/82* (2022.01)
*G06V 10/94* (2022.01)
*G06V 20/64* (2022.01)

(52) U.S. Cl.
CPC .......... *G06V 10/7747* (2022.01); *G06V 10/82* (2022.01); *G06V 10/94* (2022.01); *G06V 20/647* (2022.01)

(58) Field of Classification Search
CPC ...... G06V 10/94; G06V 20/647; G06V 20/56; Y02T 10/40
See application file for complete search history.

(56) References Cited

U.S. PATENT DOCUMENTS

2023/0386231 A1* 11/2023 Lee ...................... G06V 10/774
2024/0010225 A1* 1/2024 Huang ................ B60W 60/001

FOREIGN PATENT DOCUMENTS

| CN | 114495038 | | 5/2022 | |
|---|---|---|---|---|
| CN | 117133032 | A * | 11/2023 | |
| GB | 2623620 | A * | 4/2024 | ............. G06T 15/60 |
| WO | WO-2017004799 | A1 * | 1/2017 | ........... B64C 39/024 |
| WO | WO-2021155308 | A1 * | 8/2021 | ............. G06T 7/579 |
| WO | WO-2021254107 | A1 * | 12/2021 | ............... G06F 3/14 |

OTHER PUBLICATIONS

Chen, Liang-Chieh, et al. "Deeplab: Semantic image segmentation with deep convolutional nets, atrous convolution, and fully connected crfs." IEEE transactions on pattern analysis and machine intelligence 40.4 (2017): 834-848. (Year: 2017).*

Y. Guo and B. Yang, "A Survey of Semantic Segmentation Methods in Traffic Scenarios," 2022 International Conference on Machine Learning, Cloud Computing and Intelligent Mining (MLCCIM), Xiamen, China, 2022, pp. 452-457, doi: 10.1109/MLCCIM55934.2022.00083. (Year: 2022).*

T. Le, L. Hamilton and A. Torralba, "Benchmarking Convolutional Neural Networks for Object Segmentation and Pose Estimation," 2017 IEEE Applied Imagery Pattern Recognition Workshop (AIPR), Washington, DC, USA, 2017, pp. 1-10, doi: 10.1109/AIPR.2017.8457942. (Year: 2017).*

* cited by examiner

METHOD FOR DETECTING THREE-DIMENSIONAL OBJECTS IN ROADWAY AND ELECTRONIC DEVICE

This application claims priority to Chinese Patent Application No. 202210613588.2 filed on May 31, 2022, in China National Intellectual Property Administration, the contents of which are incorporated by reference herein.

FIELD

The subject matter herein generally relates to a computer vision technology field, in particular, relates to a method for detecting three-dimensional (3D) objects in roadway and an electronic device.

BACKGROUND

In a field of autonomous driving, an autonomous driving system uses different types of sensors to detect objects in front of or near a vehicle and make corresponding driving decisions. Therefore, the automatic driving system needs to quickly and accurately detect the types and the position of the objects, and make corresponding decisions to ensure driving safety. At present, the categories and position of the objects are detected by the 3D object detection algorithms, and 3D position of the objects is obtained by a regression operation. However, the regression operation takes a long time to predict the 3D position of the objects. In addition, in the current 3D object detection algorithms, lidars or radars are often used to obtain depth information to detect a distance between the vehicle and the objects in front of the vehicle, but the cost of the lidars or radars are expensive and the field of view of the lidars or radars is relatively narrow.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
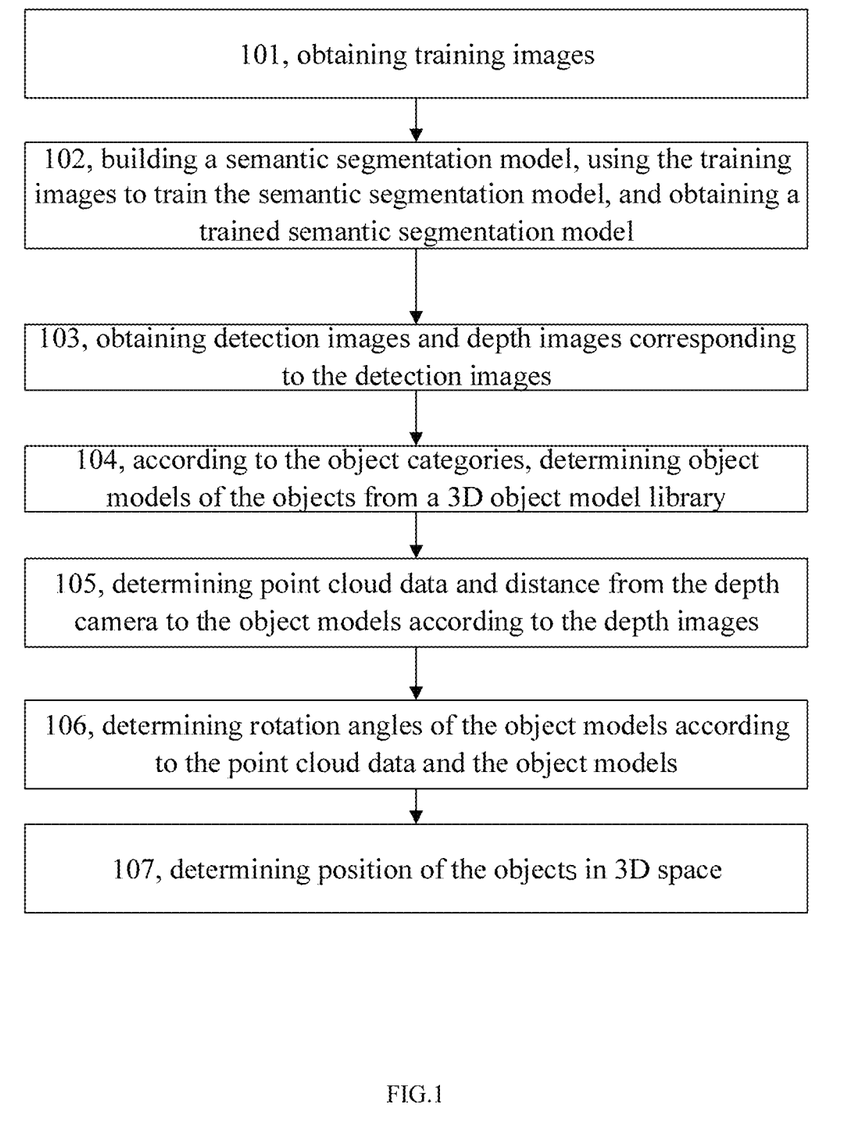
FIG. 1 is a flowchart of one embodiment of a method for detecting 3D objects in roadway.

FIG. 1 illustrates a method for detecting three-dimensional objects in roadway. The method is applied in an electronic device (referring to FIG. 4) mounted in a vehicle. The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method for detecting three-dimensional objects in roadway is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining training images.

In one embodiment, the training images include, but are not limited to, images of scenes on various roads in different time periods. The roads can be city roads or village roads. In one embodiment, the training images include images in a Pascal VOC dataset, or a Cityscapes dataset.

In one embodiment, the method further includes: performing data augmentation operations on the training images to gather different training images. In one embodiment, the data augmentation operations include, but are not limited to, flipping images, rotating the images, scaling the images, cropping the images. It should be noted that, by the data enhancement operation, more images in front of the vehicle in different scenarios can be obtained as the training samples, a semantic segmentation model can be trained and optimized to improve a robustness of the semantic segmentation model.

At block 102, building a semantic segmentation model, using the training images to train the semantic segmentation model, and obtaining a trained semantic segmentation model.

In one embodiment, building the semantic segmentation model includes: building the semantic segmentation model based on a fully convolutional network. Based on the fully convolutional network, a number of objects in the images input into the fully convolutional network can be segmented and identified. For example, one image including objects in or around a road such as cars, people, dogs can be input into the semantic segmentation model. After the objects of the image are segmented and identified by the semantic segmentation model, the object categories of the objects in the training images and the positions of the objects are output.

Figure 2:
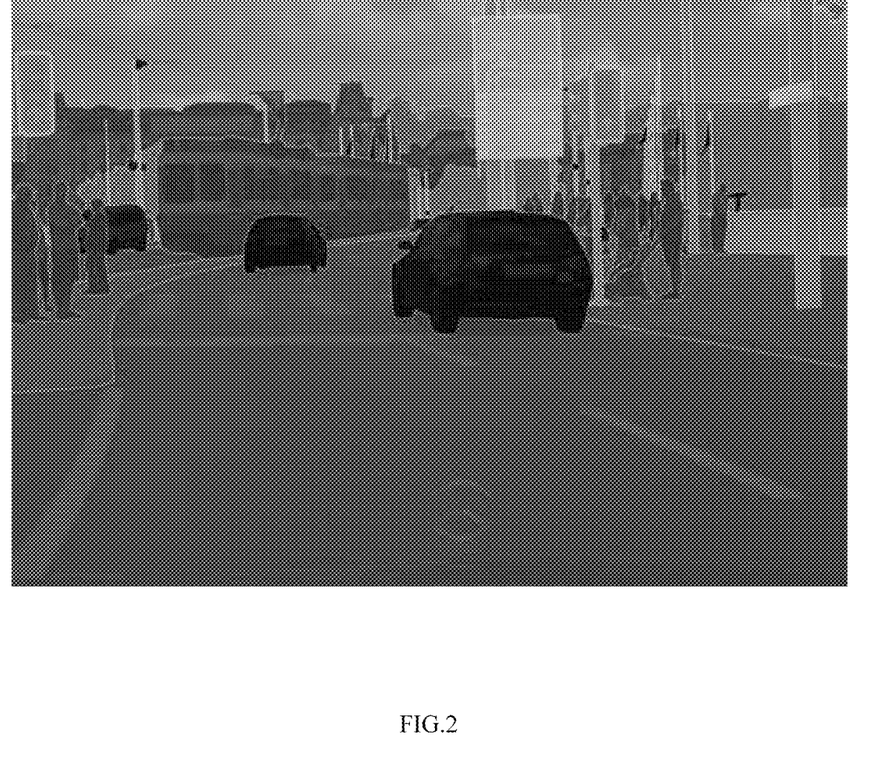
FIG. 2 is a schematic diagram of images segmented by a trained semantic segmentation model.

In one embodiment, using the training images to train the semantic segmentation model and obtaining a trained semantic segmentation model includes: inputting the training images into the semantic segmentation model, and performing convolution operations by convolution layers of the semantic segmentation model and performing pooling operations by pooling layers of the semantic segmentation model, and obtaining feature maps with different sizes; performing up-sampling operations and deconvolution operations on the feature maps, and obtaining an operation result; performing a summation operation on the operation result and obtaining first images having same size as the training images; performing pixel classification on the first images, calculating and optimizing a classification loss of a loss function, and outputting the object categories of the objects in the training images and the positions of the objects, and thereby obtaining the trained semantic segmentation model. In one embodiment, the semantic segmentation model is trained by using a Softmax cross-entropy function as the loss function of the semantic segmentation model. The trained semantic segmentation model is used to segment the images input into the trained semantic segmentation model. For example, FIG. 2 illustrates images segmented by the trained semantic segmentation model.

At block 103, obtaining detection images and depth images corresponding to the detection images.

In one embodiment, the electronic device captures images of scenes by a camera installed inside or outside a vehicle, and determines images of the scenes in front of the vehicle as the detection images.

In one embodiment, obtaining the depth images corresponding to the detection images includes: using a depth camera to acquire the depth images. For example, the electronic device uses the depth camera mounted on the vehicle to capture images of the scenes in front of the vehicle as the depth images. It should be noted that when a camera installed inside or outside the vehicle is used to capture images of the scenes in front of the vehicle as the detection images, the depth camera simultaneously captures the images of the scenes in front of the vehicle as the depth images, and the depth images correspond to the detection images. For example, different types of cameras may be used to capture images of the same objects in the scenes in front of the vehicle to obtain the detection images and the depth images.

In one embodiment, the method further includes: obtaining depth information of the depth images from the depth camera.

At block 104, according to the object categories, determining object models of the objects from a 3D object model library.

Figure 3:
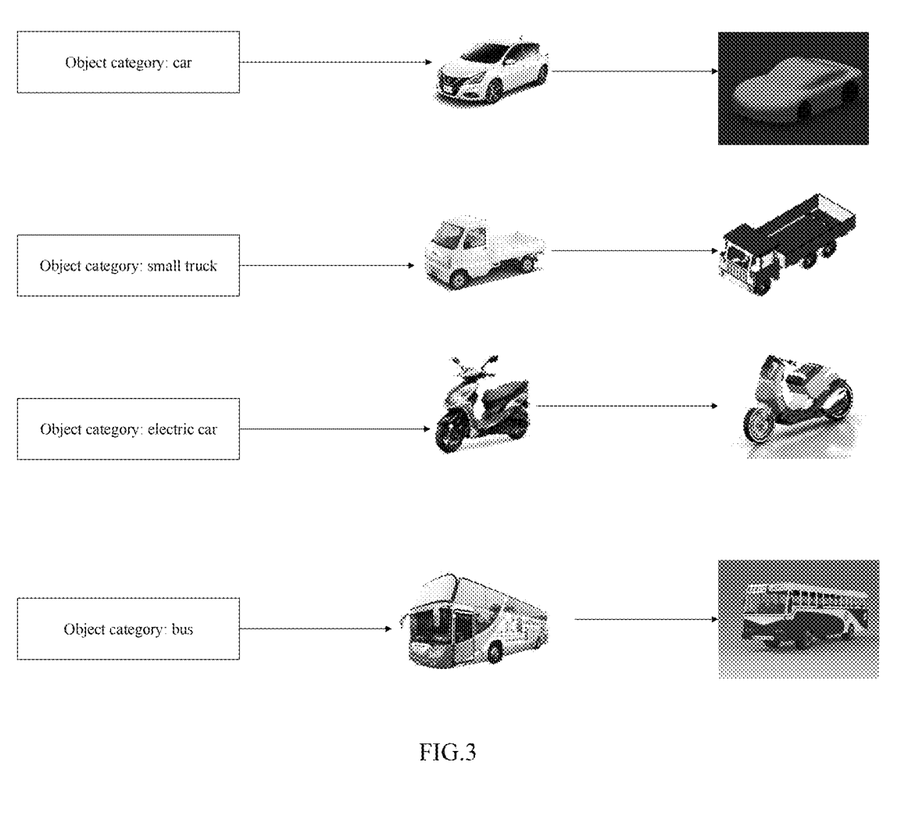
FIG. 3 is a schematic diagram of a 3D object model library.

In one embodiment, determining object models of the objects from a 3D object model library includes: building the 3D object model library, and the 3D object model library including the object categories and the object models corresponding to the object categories; searching the 3D object model library according to the object categories, and determining the object models of the objects. FIG. 3 illustrates the 3D object model library. For example, when the object category is a car, searching the object model of the car based on the 3D object model library; when the object category is a small truck, searching the object model of the small truck based on the 3D object model library; when the object category is an electric car, searching the object model of the electric car based on the 3D object model library; when the object category is a bus, searching the object model of the bus based on the 3D object model library.

In one embodiment, the object models of the objects include 3D models of the objects.

At block 105, determining point cloud data and distances from the depth camera to the object models according to the depth images.

In one embodiment, determining the distances from the depth camera to the object models according to the depth images includes: obtaining depth values of the objects according to the depth images; determining the distances from the depth camera to the object models of the objects according to the depth values. In one embodiment, the depth values are obtained from the depth camera. In one embodiment, when the depth images are obtained by using the depth camera, the depth values are the distances from the depth camera to the objects corresponding to the object models. In one embodiment, the distances from the depth camera to the objects are the distances from the depth camera to the object models of the objects.

In one embodiment, determining the point cloud data includes: obtaining a coordinate set of the objects according to the depth images; determining the point cloud data of the objects according to the coordinate set and an internal and external parameter matrix transformation formula of the depth camera. In one embodiment, the coordinate set of the objects is a pixel coordinate set of the objects, and the point cloud data of the objects includes world coordinates corresponding to coordinates in the coordinate set of the objects. The point cloud data of the objects represents outline data of the objects. In one embodiment, the coordinates in the coordinate set of the objects are converted into the world coordinates by the internal and external parameter matrix transformation formula:

$$\begin{bmatrix} x \\ y \\ z \end{bmatrix} = D \begin{bmatrix} \frac{f}{dx} & 0 & 0 \\ 0 & \frac{f}{dy} & 0 \\ 0 & 0 & 1 \end{bmatrix} \begin{bmatrix} x_1 \\ y_1 \\ 1 \end{bmatrix}$$

Wherein, (x, y, z) is one of the world coordinates, used to represent the point cloud of the one of the world coordinates, f is a focal length of the depth camera, D is the depth value, and (x1, y1) is the any coordinate in the coordinate set of the objects. The above formula is used to convert all the coordinates in the coordinate set into world coordinates to obtain the point cloud data of the objects.

At block 106, determining rotation angles of the object models according to the point cloud data and the object models.

In one embodiment, determining rotation angles of the object models according to the point cloud data and the object models includes: according to the point cloud data, obtaining a first point cloud data of the outline of the objects; converting the object models into a second point cloud data; matching the first point cloud data with the second point cloud data, fitting the points of the outline of the objects in the first point cloud data to generate a first plane and calculating a curvature of the first plane; fitting the points of the outline of the objects in the second point cloud data to generate a second plane and calculating the curvature of the second plane; calculating a value of difference between the curvature of the first plane and the curvature of the second plane and obtaining a curvature deviation value, and determining the rotation angles of the object models of the objects according to the curvature deviation value.

In one embodiment, converting the object models into the second point cloud data includes: processing the object models of the objects by using functions in a Point Cloud Library (PCL), and generating the point cloud data of the object models of the objects as the second point cloud data.

At block 107, determining positions of the objects in 3D space.

In one embodiment, determining positions of the objects in 3D space includes: determining direction of the object models in the 3D space according to the rotation angles, and determining the positions of the object models in the 3D space according to the direction of the object models, the distances from the depth camera to the object models, and the positions of the objects. In one embodiment, taking the positions of the object models in the 3D space as the positions of the objects in the 3D space, and outputting the object categories and the positions of the objects in the 3D space. For example, the object categories and the positions of the objects in the 3D space are displayed on a display screen.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 4:
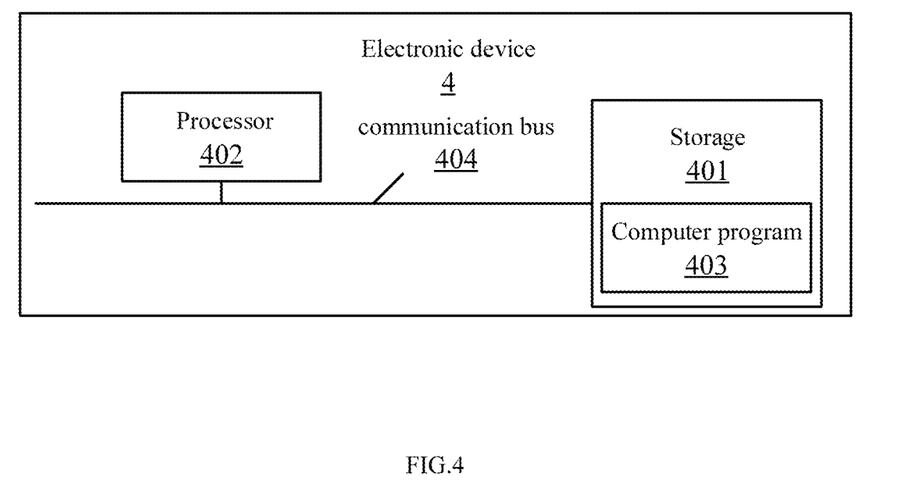
FIG. 4 is a schematic diagram of one embodiment of an electronic device.

FIG. 4 illustrates the electronic device 4 which can be vehicle-mounted. The electronic device 4 includes a storage 401, a processor 402, a computer program 403 stored in the storage 401, and at least one communication bus 404. In one embodiment, electronic device 4 can be an in-vehicle device. The in-vehicle device is provided on a vehicle, and the in-vehicle device may be an in-vehicle computer.

Those skilled in the art can understand that the device shown in FIG. 4 is only an example of the electronic device 4, and does not constitute a limitation on the electronic device 4. Other examples may include more or less components than those shown in the drawings, or different combinations of components, or different components, for example, the electronic device 4 may also include input and output devices, network access devices, and the like.

The at least one processor 402 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 402 can be a microprocessor or the at least one processor 402 can also be any conventional processor, etc. The at least one processor 402 is the control center of the electronic device 4, using various interfaces and lines to connect various parts of the entire electronic device 4.

The storage 401 can be used to store the computer program 403, and the at least one processor 402 implements the electronic program by executing the computer program 403 stored in the storage 401 and calling up the data stored in the storage 401. The storage 401 may include a stored program area and a stored data area, wherein the stored program area may store an operating system, an application program required for at least one function (such as a sound playback function, an image playback function, etc.), etc. The storage data area may store data (such as audio data) created according to the use of the electronic device 4, etc. In addition, the storage 401 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 4 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for detecting three-dimensional (3D) objects in roadway comprising:
   obtaining training images;
   building a semantic segmentation model based on a fully convolutional network;
   inputting the training images into the semantic segmentation model, and performing convolution operations by convolution layers of the semantic segmentation model and performing pooling operations by pooling layers of the semantic segmentation model, and obtaining feature maps with different sizes output by the semantic segmentation model;

performing up-sampling operations on the feature maps, and obtaining first images having a same size as the training images, performing pixel classification on the first images, calculating and optimizing a classification loss of a loss function, and outputting object categories of objects in the training images and position of the objects, and obtaining a trained semantic segmentation model;

obtaining detection images and obtaining depth images corresponding to the detection images by using a depth camera;

inputting the detection images into the trained semantic segmentation model, and obtaining object categories of the objects and position of the objects in the detection images;

determining object models of the objects from a 3D object model library according to the object categories;

determining point cloud data and a distance from the depth camera to the object models according to the depth images;

determining rotation angles of the object models according to the point cloud data and the object models;

determining position of the object models in 3D space according to the distance from the depth camera to the object models, the rotation angles and the position of the objects.

2. The method as claimed in claim 1, further comprising:
performing deconvolution operations on the feature maps after performing the up-sampling operations, and obtaining an operation result;
performing a summation operation on the operation result and obtaining the first images.

3. The method as claimed in claim 1, further comprising:
searching the 3D object model library according to the object categories, and determining the object models of the objects, wherein the 3D object model library comprises the object categories and the object models corresponding to the object categories.

4. The method as claimed in claim 1, further comprising:
obtaining depth values of the objects according to the depth images, and determining the distance from the depth camera to the object models of the objects according to the depth values;
obtaining a coordinate set of the objects according to the depth images;
determining the point cloud data of the objects according to the coordinate set and an internal and external parameter matrix transformation formula of the depth camera.

5. The method as claimed in claim 1, further comprising:
obtaining a first point cloud data of an outline of the objects according to the point cloud data;
converting the object models into a second point cloud data;
matching the first point cloud data with the second point cloud data, fitting the points of the outline of the objects in the first point cloud data, generating a first plane, and calculating a curvature of the first plane;
fitting the points of the outline of the objects in the second point cloud data and generating a second plane and calculating the curvature of the second plane;
calculating a difference value between the curvature of the first plane and the curvature of the second plane and obtaining a curvature deviation value, and determining the rotation angles of the object models of the objects according to the curvature deviation value.

6. The method as claimed in claim 5, further comprising:
processing the object models of the objects by using functions in a Point Cloud Library, and generating the point cloud data of the object models of the objects as the second point cloud data.

7. The method as claimed in claim 1, further comprising:
determining direction of the object models in the 3D space according to the rotation angles;
determining the position of the object models in the 3D space according to the direction of the object models, the distance from the depth camera to the object models, and the position of the objects.

8. The method as claimed in claim 1, further comprising:
taking the position of the object models in the 3D space as the position of the objects in the 3D space, and outputting the object categories and the position of the objects in the 3D space.

9. An electronic device comprising:
a processor; and
a non-transitory storage medium coupled to the processor and configured to store a plurality of instructions, which cause the processor to:
obtain training images;
build a semantic segmentation model based on a fully convolutional network;
input the training images into the semantic segmentation model, and perform convolution operations by convolution layers of the semantic segmentation model and perform pooling operations by pooling layers of the semantic segmentation model, and obtain feature maps with different sizes output by the semantic segmentation model;
perform up-sampling operations on the feature maps, and obtain first images having a same size as the training images, perform pixel classification on the first images, calculate and optimize a classification loss of a loss function, and output object categories of objects in the training images and position of the objects, and obtain a trained semantic segmentation model;
obtain detection images and obtaining depth images corresponding to the detection images by using a depth camera;
input the detection images into the trained semantic segmentation model, and obtain object categories of the objects and position of the objects in the detection images;
determine object models of the objects from a 3D object model library according to the object categories;
determine point cloud data and a distance from the depth camera to the object models according to the depth images;
determine rotation angles of the object models according to the point cloud data and the object models;
determine position of the object models in 3D space according to the distance from the depth camera to the object models, the rotation angles and the position of the objects.

10. The electronic device as claimed in claim 9, wherein the plurality of instructions are further configured to cause the processor to:
perform deconvolution operations on the feature maps after performing the up-sampling operations, and obtain an operation result;
perform a summation operation on the operation result and obtain the first images.

11. The electronic device as claimed in claim 9, wherein the plurality of instructions are further configured to cause the processor to:
   search the 3D object model library according to the object categories, and determine the object models of the objects, wherein the 3D object model library comprises the object categories and the object models corresponding to the object categories.

12. The electronic device as claimed in claim 9, wherein the plurality of instructions are further configured to cause the processor to:
   obtain depth values of the objects according to the depth images, and determine the distance from the depth camera to the object models of the objects according to the depth values;
   obtain a coordinate set of the objects according to the depth images;
   determine the point cloud data of the objects according to the coordinate set and an internal and external parameter matrix transformation formula of the depth camera.

13. The electronic device as claimed in claim 9, wherein the plurality of instructions are further configured to cause the processor to:
   obtain a first point cloud data of an outline of the objects according to the point cloud data;
   convert the object models into a second point cloud data;
   match the first point cloud data with the second point cloud data, fit the points of the outline of the objects in the first point cloud data, and generate a first plane, and calculate a curvature of the first plane;
   fit the points of the outline of the objects in the second point cloud data, and generate a second plane, and calculate the curvature of the second plane;
   calculate a difference value between the curvature of the first plane and the curvature of the second plane and obtain a curvature deviation value, and determine the rotation angles of the object models of the objects according to the curvature deviation value.

14. The electronic device as claimed in claim 13, wherein the plurality of instructions are further configured to cause the processor to:
   process the object models of the objects by using functions in a Point Cloud Library, and generate the point cloud data of the object models of the objects as the second point cloud data.

15. The electronic device as claimed in claim 9, wherein the plurality of instructions are further configured to cause the processor to:
   determine direction of the object models in the 3D space according to the rotation angles;
   determine the position of the object models in the 3D space according to the direction of the object models, the distance from the depth camera to the object models, and the position of the objects.

16. The electronic device as claimed in claim 9, wherein the plurality of instructions are further configured to cause the processor to:
   take the position of the object models in the 3D space as the position of the objects in the 3D space, and output the object categories and the position of the objects in the 3D space.

17. A non-transitory storage medium having stored thereon instructions that, in response that executed by at least one processor of an electronic device, causes the least one processor to execute instructions of a method for detecting three-dimensional (3D) objects in roadway, the method comprising:
   obtaining training images;
   building a semantic segmentation model based on a fully convolutional network;
   inputting the training images into the semantic segmentation model, and performing convolution operations by convolution layers of the semantic segmentation model and performing pooling operations by pooling layers of the semantic segmentation model, and obtaining feature maps with different sizes output by the semantic segmentation model;
   performing up-sampling operations on the feature maps, and obtaining first images having a same size as the training images, performing pixel classification on the first images, calculating and optimizing a classification loss of a loss function, and outputting object categories of objects in the training images and position of the objects, and obtaining a trained semantic segmentation model;
   obtaining detection images and obtaining depth images corresponding to the detection images by using a depth camera;
   inputting the detection images into the trained semantic segmentation model, and obtaining object categories of the objects and position of the objects in the detection images;
   determining object models of the objects from a 3D object model library according to the object categories;
   determining point cloud data and a distance from the depth camera to the object models according to the depth images;
   determining rotation angles of the object models according to the point cloud data and the object models;
   determining position of the object models in 3D space according to the distance from the depth camera to the object models, the rotation angles and the position of the objects.

18. The non-transitory storage medium as recited in claim 17, wherein the method further comprises:
   performing deconvolution operations on the feature maps after performing the up-sampling operations, and obtaining an operation result;
   performing a summation operation on the operation result and obtaining the first images.

19. The non-transitory storage medium as recited in claim 17, wherein the method further comprises:
   searching the 3D object model library according to the object categories, and determining the object models of the objects, wherein the 3D object model library comprises the object categories and the object models corresponding to the object categories.

20. The non-transitory storage medium as recited in claim 17, wherein the method further comprises:
   obtaining depth values of the objects according to the depth images, and determining the distance from the depth camera to the object models of the objects according to the depth values;
   obtaining a coordinate set of the objects according to the depth images;
   determining the point cloud data of the objects according to the coordinate set and an internal and external parameter matrix transformation formula of the depth camera.

* * * * *